A. GAIDE.
SAFETY SYSTEM FOR REFRIGERATING APPARATUS.
APPLICATION FILED MAY 2, 1910.

971,984.

Patented Oct. 4, 1910.
4 SHEETS—SHEET 1.

Witnesses
Inventor
Albert Gaide
his Attorney

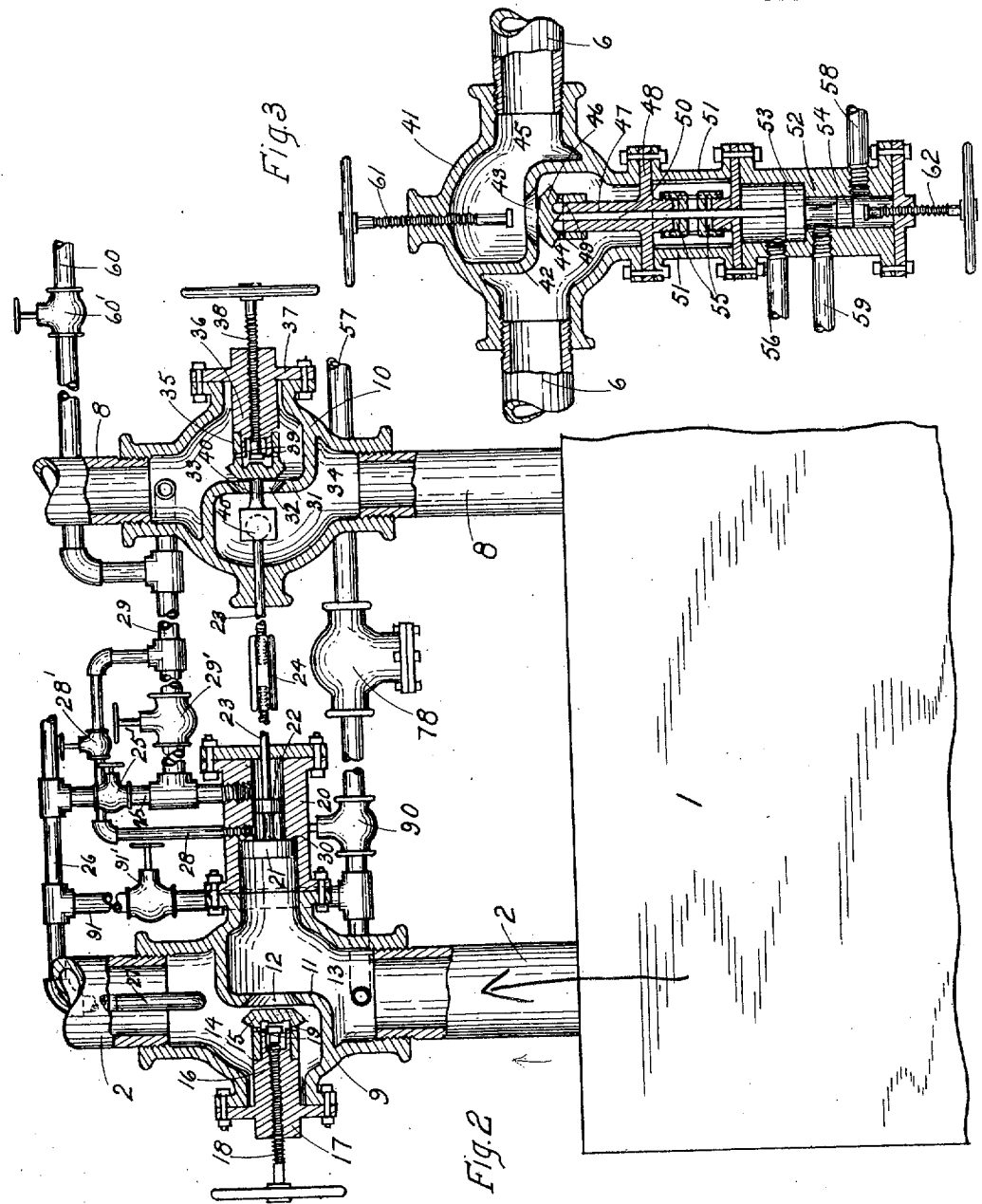

A. GAIDE.
SAFETY SYSTEM FOR REFRIGERATING APPARATUS.
APPLICATION FILED MAY 2, 1910.

971,984.

Patented Oct. 4, 1910.
4 SHEETS—SHEET 3.

Witnesses
H. Hansen
A. A. Olson.

Inventor
Albert Gaide
By Joshua R. H. Potts
his Attorney.

A. GAIDE.
SAFETY SYSTEM FOR REFRIGERATING APPARATUS.
APPLICATION FILED MAY 2, 1910.
971,984.
Patented Oct. 4, 1910.
4 SHEETS—SHEET 4.
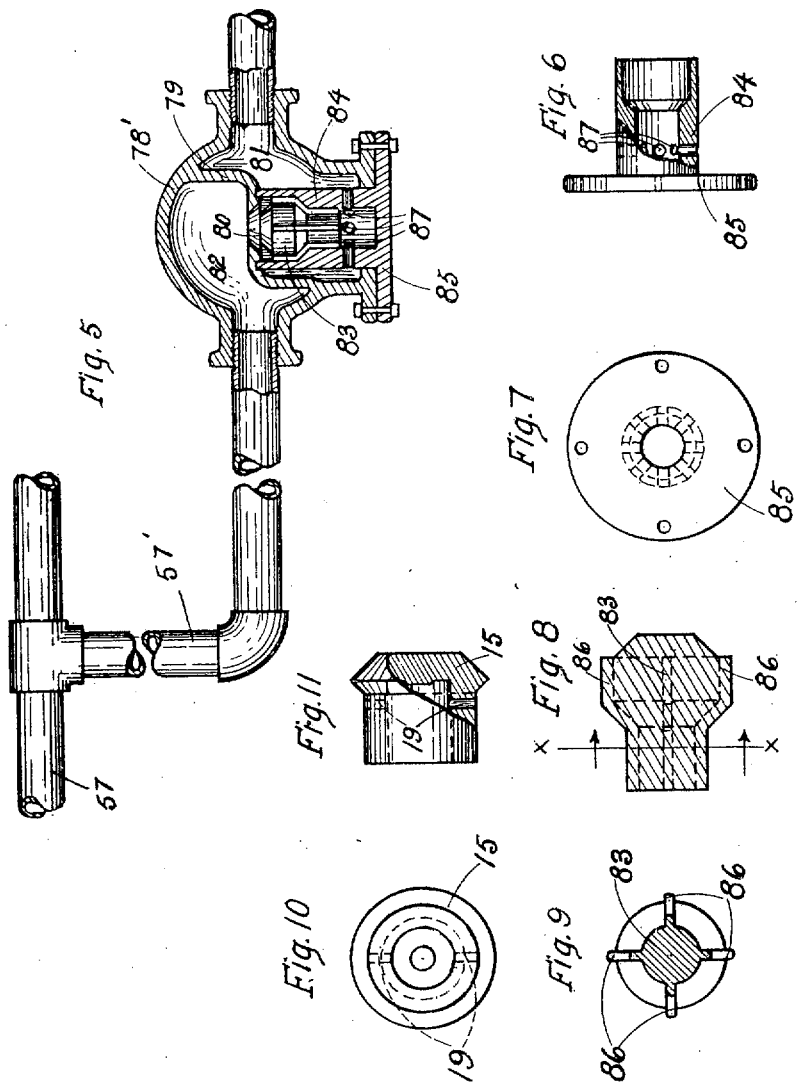
Witnesses
H. Hansen
A. A. Olson.
Inventor
Albert Gaide
By Joshua R. H. Potts
his Attorney

UNITED STATES PATENT OFFICE.

ALBERT GAIDE, OF CHICAGO, ILLINOIS.

SAFETY SYSTEM FOR REFRIGERATING APPARATUS.

971,984. Specification of Letters Patent. Patented Oct. 4, 1910.

Application filed May 2, 1910. Serial No. 558,777.

*To all whom it may concern:*

Be it known that I, ALBERT GAIDE, a citizen of the United States, residing at Chicago, in the county of Cook and State of Illinois, have invented a new and Improved Safety System for Refrigerating Apparatus, of which the following is a specification.

My invention relates to a safety system for refrigerating apparatus.

The object of my invention is the provision of a system of the character mentioned adapted, upon the disabling of the compressor included in the refrigerating apparatus, such as blowing out of the head of the compressor, this not infrequently occurring because of the great internal pressure to which the walls of the compressor are subjected when the apparatus is in operation, will be adapted to automatically stop the flow of cooling fluid through the apparatus and thus, upon such occurrence, to reduce the escapement and loss of such fluid to a minimum.

A further object is the provision of a safety system as mentioned, which upon the occurrence of an accident as above mentioned, will, in addition to causing the stop of the flow of fluid through the system, also effect the automatic cessation of the refrigerating machinery.

A further object is the provision of a safety system for refrigerating apparatus which will be of durable and economical construction and positive and efficient in operation.

Other objects will appear hereinafter.

With these objects in view my invention consists in a safety system for refrigerating apparatus characterized as above mentioned and in certain details of construction and arrangement of parts all as will be hereinafter fully described and more particularly pointed out in the appended claims.

Figure 1:
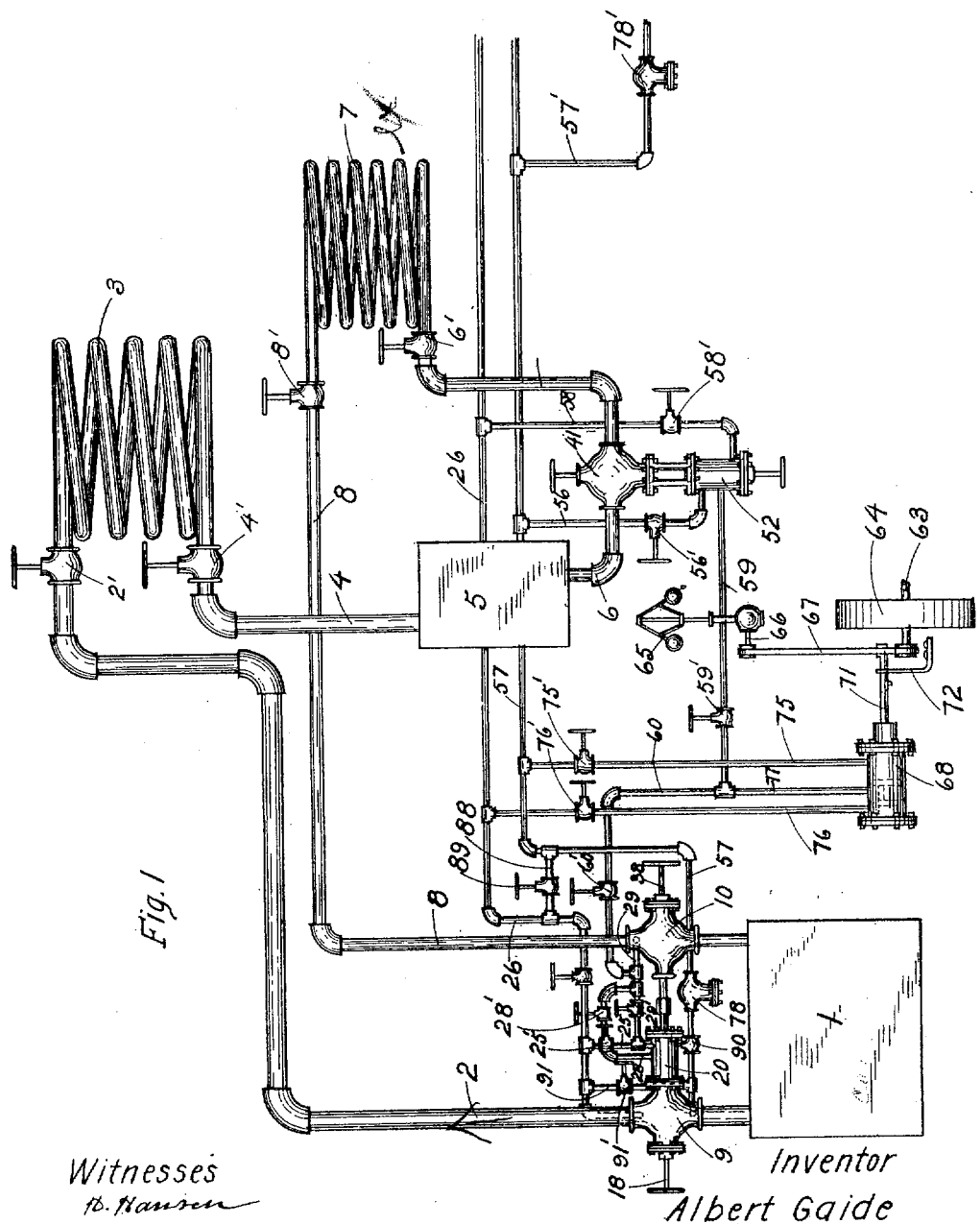
Figure 4:
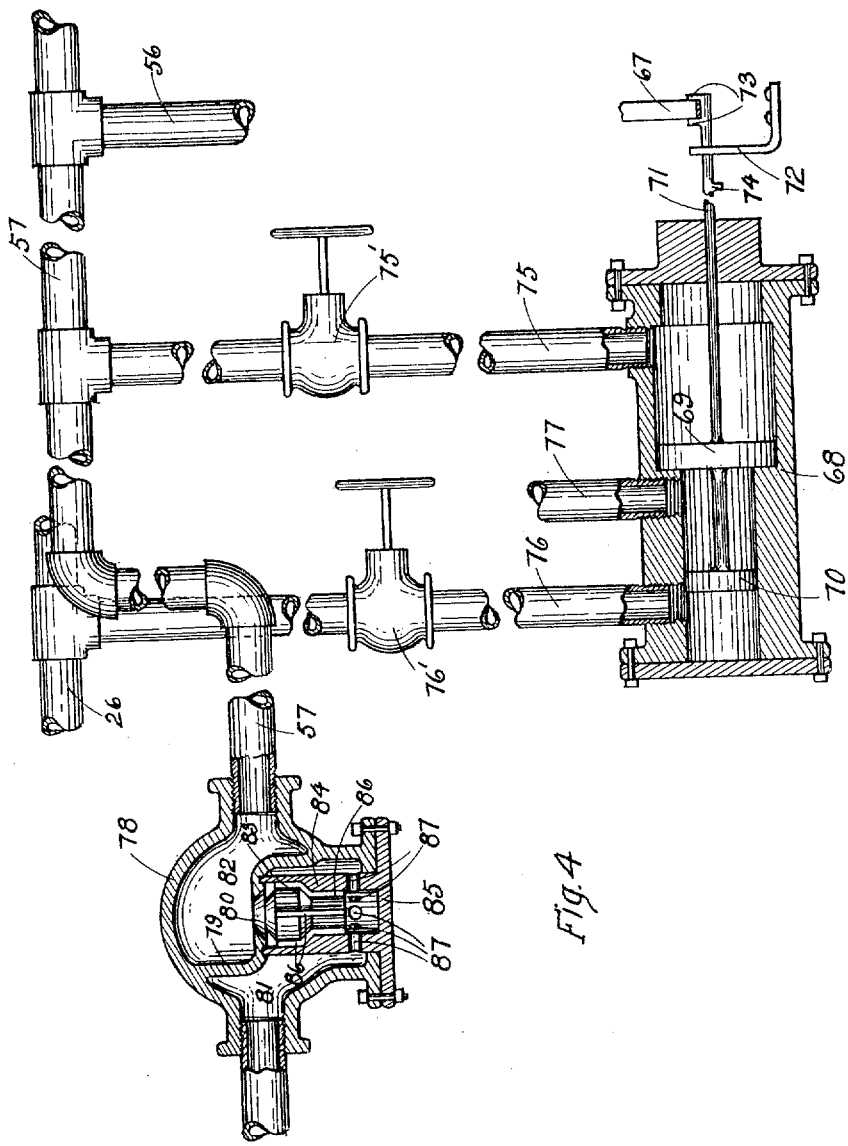

The invention will be more readily understood by reference to the accompanying drawings forming a part of this specification, and in which, Figure 1 is a diagrammatic view of an ordinary refrigerating apparatus or plant equipped with a safety system embodying the preferred form of my invention, Fig. 2 is an enlarged detail, partially sectional and partially elevational, of certain of the valves and adjacent piping embodied in my invention, Fig. 3 is an enlarged central section of another of the valves included in the system, Fig. 4 is a sectional elevation of another portion of the system showing the governor-belt shifter included therein, Fig. 5 is a central section of one of the check valves of the system, Figs. 6, 7, 8 and 9 are details of the valve shown in Fig. 5, Fig. 6 being an end elevation and Fig. 7 a sectional side elevation of the valve guide, Fig. 8 being a central section of the valve, and Fig. 9 a transverse section on line $x$—$x$ of Fig. 8, and Figs. 10 and 11 are details of one of the valves shown in section in Fig. 2, the former being an end elevation and the latter a sectional side elevation thereof.

Referring now to the drawings, the refrigerating apparatus illustrated therein consists of a compressor 1 equipped with the usual check valves. Extending from said compressor is an outlet pipe 2 which leads to the condensing coils 3.

2′ indicates a stop cock which, when the apparatus is in operation, normally remains open.

Extending from the lower end of the coils 3 is a pipe 4 in which is interposed a stop cock 4′ the same also normally remaining in open condition. The pipe 4 communicates with the liquid receiver 5, and from the latter extends an outlet pipe 6 which communicates with expansion coils 7. A normally open stop cock 6′ is also shown interposed in the pipe 6. A return pipe 8 extends from the outlet end of the coils 7 to the inlet of the compressor 1. A normally open stop cock 8′ is also interposed in the pipe 8. This is the usual construction and arrangement of the conventional refrigerating plants for coöperation with which my safety system is especially designed.

Interposed in the pipe 2 adjacent the compressor 1 is a valve casing 9, and interposed in the pipe 8 in transverse alinement with the casing 9 a similar valve casing 10. Formed in the casing 9 is the partition 11. Provided in said partition is an opening or port 12 which establishes communication between the inlet chamber 13 and the outlet chamber 14 formed in said casing 15 indicates a valve which controls the opening 12, the rearward tubularly formed end of said valve being slidably mounted upon an inwardly extending guide 16 formed upon the head 17 of the casing 9. A stem 18 threaded in the head 17 and extension 16 is adapted to be manually operated to effect the seating of the valve 15.

Openings 19 provided in the tubular rearward end portion of said valve serve in an obvious capacity. The valve 15 is so arranged that the same will be normally held in open position by the passage of fluid upwardly through the pipe 2, the same being so arranged that upon reversal of the flow of fluid through said pipe, such as would occur in the event of sudden reduction of pressure in the compressor 1, the same will be automatically forced to closing position.

Secured upon the opposite side of the casing 9 is a differential cylinder 20, the larger piston chamber thereof communicating as shown with the inlet chamber 13 of said casing. Operating in the cylinder 20 is a differential piston, composed of the larger piston 21 and the smaller piston 22. Said differential piston is carried by the exteriorly projecting piston rod 23 which extends through and terminates in the valve casing 10. Said piston rod is formed, as indicated, in two parts, these parts being connected by a turn-buckle or adjusting screw 24 whereby adjustment of the length of said piston rod may be readily effected. A pipe 25 communicates at its lower end with the smaller piston chamber of the cylinder 20, said pipe communicating at its upper extremity with a pipe 26, one extremity 27 of which terminates at the outlet side of the valve 15, said extremity 27 being preferably bent so that the upward passage through the pipe 2 will tend to exhaust the fluid from the pipe 26. A normally open stop cock 25' is interposed in the pipe 25. A pipe 29 intersects the pipe 25 at one extremity and communicates at its other extremity with the outlet chamber (hereinafter described) of the valve casing 10. Interposed in the pipe 29 is a normally closed stop cock 29'. A pipe 28 communicates at one end with the chamber formed between the pistons 21 and 22, said pipe at its opposite end intersecting the pipe 29 intermediate the valve 29' and the valve casing 10.

The arrangement is such that, under normal conditions, the pressure in the pipe 2 will act upon the piston 21 to force the same against a shoulder 30 formed in the cylinder 20, or at its outermost extremity of movement. Upon a sudden reduction of pressure in the compressor 1, in which event the pressure in the chamber 13 of the valve casing 9 will be correspondingly reduced, the pressure in the chamber 14, the pressure in which chamber remaining, because of the valve 15, substantially the same, will through the medium of the pipes 26 and 25 act upon the smaller piston 22 to cause the inward sliding thereof and hence of the piston rod 23 carried thereby. The purpose of the pipe 28, upon the returning of the pistons 21 and 22, is obvious.

Formed in the casing 10 is a partition 31. Provided in said partition is an opening or port 32 which establishes communication between the inlet chamber 33 of said casing 10 and the outlet chamber 34. A valve 35 governs the opening 32, said valve being slidably mounted upon an inwardly projecting guide 36 formed integral with the head 37. A stem 38 threaded in the head 37 and extension 36 affords means whereby the valve 39 may be manually closed. Openings 39 formed in the valve 35 serve in an obvious capacity. Formed centrally upon the front side of the valve 35 is an extension 40 which is connected by means of a coupling 40' with the co-axially extending piston rod 23. With this arrangement therefore, upon the above mentioned inward movement of the differential piston, as caused by the reduction of pressure in the compressor 1 and valve chamber 13, said valve 35 will be moved therewith to closing position. Hence, upon such disabling of the compressor 1 passage through both pipes 2 and 8 will automatically be stopped. With this arrangement, also when the pressure in the compressor 1 is restored to a degree above that in the pipe 2 above the valve 15, said valves will be automatically opened, such pressure acting directly on the valve 15 to open the same and through the differential piston to open the valve 35.

Interposed in the pipe 6 is a valve casing 41. Formed in the interior of said valve is a partition 42, in which is formed an opening or port 43 which establishes communication between the inlet chamber 44 and the outlet chamber 45.

46 designates a valve which is adapted to control the passage through the opening 43, said valve being slidably mounted upon an extension 47 formed centrally upon the inner side of the head 48. Openings 49 formed in the rearward or lower tubular portion of said valve serve in an obvious capacity. The valve 46 is carried by a stem 50 which projects through the extension 47 and head 48 exteriorly. Rigidly secured by means of brackets 51 to the head 48 co-axially therewith is a differential cylinder 52. Operating in said cylinder is a differential piston comprising the larger piston 53 and the smaller piston 54 which are connected to the lower extremity of the stem 50. In order to insure tight connections packings 55 surround the stem 50. A pipe 56 communicates at one end with the larger piston chamber of the cylinder 52 and at its opposite end intersects a pipe 57 which communicates at one end with the chamber 13 of the valve casing 9. Interposed in the pipe 56 is a normally open stop cock 56'. A pipe 58 communicates at one end with the smaller piston chamber of the cylinder 52 and at its opposite extremity intersects the pipe 26. Interposed in the pipe 58 is a normally open stop cock 58'. A pipe 59 communicates at one extremity with the chamber between the pistons 53 and 54 and at its opposite extremity said pipe is connected with a pipe 60 which intersects the pipe 29. Interposed in said pipes 59 and 60 are normally open stop cocks 59' and 60' respectively.

With this arrangement it will be seen that under normal conditions the pressure in the chamber 13 of the valve casing 9 will act upon the larger piston 53 and which, through differential action, will evidently serve to hold the valve 46 in open position. However, with this construction, upon the above mentioned sudden reduction of pressure in the compressor 1, the pressure upon the piston 53 will be correspondingly reduced, whereupon the excess pressure in the chamber 14 of the valve casing 9 will act, through the medium of the pipes 26 and 58, upon the smaller piston 54, to cause the closing of the valve 46. Hence, upon the disabling of the compressor 1 passage through the pipe 6 will also be automatically closed. By means of threaded screws 61 and 62 manual operation of the valve 46 may evidently be effected.

63 indicates the power shaft of the operating machinery employed in conjunction with the refrigerating apparatus, 64 indicating the fly wheel thereof. 65 designates the governor of said machinery the shaft 66 of which is operatively connected by means of the belt 67 with said power shaft 63. As is known, in machinery of this type, at the present time, a governor is so connected with the machinery proper that upon stoppage of the governor the machinery will also be automatically stopped. This is an old expedient, and hence the details whereby such cessation of the machinery is effected, upon the stoppage of the governor, is not shown.

Arranged adjacent the belt 67 is a differential cylinder 68. Operating in said cylinder is a differential piston comprising the larger piston 69 and the smaller piston 70. The piston rod 71 which carries said differential piston projects exteriorly through a guide bracket 72. The outer extremity of said piston rod is provided with spaced fingers 73 between which the belt 67 operates, said piston rod being thus formed to constitute a belt-shifter. A projection 74 formed upon the rod 71 is adapted to engage the guide bracket 72 to limit the shifting movement of said piston rod, the arrangement being such that upon the outward movement of said piston rod the belt 67 will be switched to inoperative position to effect the disconnection of the power shaft 63 and the governor 65.

A pipe 75 communicates at one extremity with the larger piston chamber of the cylinder 68, the same at its outer extremity intersecting the pipe 57. Interposed in said pipe 75 is a normally open stop cock 75'. A pipe 76 extends between the smaller piston chamber of the cylinder 68 and the pipe 26, a normally open stop cock 76' being interposed in said pipe 76. A pipe 77 communicates at one end with the chamber formed intermediate the pistons 69 and 70 and is connected at its opposite end with the pipes 59 and 60 at their junction.

With this arrangement it will be seen that under normal conditions the pressure in the chamber 13 of the valve casing 9 will act upon the larger piston 69 to hold the piston rod 71 in normal position. Upon the above mentioned disabling of the compressor 1, the pressure upon the piston 69 will be removed and the excess pressure upon the piston 70, which piston is acted upon by the pressure in the chamber 14 in the valve 9, said piston rod 71 will be forced outwardly to effect the switching of the belt 57. Thus, upon such disabling of the compressor 1, in addition to the stoppage of flow of fluid through the pipes 2, 6 and 8, as above described, the cessation of the refrigerating machinery will also be effected.

It is customary in refrigerating establishments to operate a number of refrigerating plants, such as that described, by the same machinery. However, where this is done, it becomes customary to connect the pipes (corresponding to pipe 2 in the plant described) of the additional plants with the cylinder 68 in a manner similar to that of connecting the pipe 2 in the described apparatus with said cylinder. In order to accommodate the additional plants, the pipes 26 and 57 may be extended as indicated, and branch pipes as 57' extended therefrom connect as the opposite ends of the pipes 26 and 57 connect with the pipe 2 before described. Thus communication of all of the pipes 2 of the several plants with the pipes 75 and 76, the latter leading to the cylinder 68, may be established; and whereby disabling of the compressor of any one of said plants will effect the cessation of the machinery. However, with such arrangement, and with no further provision, it will be seen that upon the disabling of one of the compressors, such as the blowing out of the head thereof or through other leakage, the fluid from the other compressors, because of the reduction of pressure in the former, would flow through the pipe 57 into the same and thus be wasted. In order to prevent this I interpose in the pipe 57 adjacent the valve casing 9 an automatic gravity governed check valve, 78 indicating the casing thereof, and in the pipe 57', a similar valve of which 78', indicates the casing. The valves provided in the pipes 57 and 57' are of similar construction, hence only one will need be described. Provided in each casing 78 and 78' is a partition 79 in which is formed an opening or port 80 which establishes communication between the inlet and outlet chambers 81 and 82 respectively. The valve 83 controls the opening 80, the same being vertically slidable in a tubular guide 84 formed upon the inner surface of the head 85, said valve being provided upon its periphery with longitudinally extending ribs 86 which engage the inner surface of said guide and serve to hold the valve centrally therein forming fluid passages between the outer surface of the valve and the inner surface of said guide. The lower end portion of the valve 83 is reduced in order to form a shoulder, the latter resting upon a corresponding shoulder formed in the guide and whereby downward movement of the valve in the latter is limited. The lower end portion of the guide is formed with openings 87 through which the fluid passes in its passage through the casing. The construction is such that normally the valve will remain in open position by its own gravity, and the same will be adapted to prevent passage of fluid from the chamber 81 to the chamber 82, since in such passage the fluid will act upon the lower end of the valve to cause the forcing of the latter to closing position.

As will be observed, the valves 78 and 78' are oppositely arranged so that upon disabling of the compressor 1 fluid will be permitted to flow through the valve 78 but will be prevented by the valve 78' from flowing from the additional compressor toward the compressor 1, and vice versa in the event of the disabling of the additional compressor when there would be a tendency of flow in the opposite direction. Thus the above mentioned objection is eliminated. Under normal conditions the fluid in the pipes 57 and 57' is inert so that the valves therein will of their own weight remain open.

A by-pass pipe 88 connects the pipes 26 and 57 between the above mentioned check valves, said pipe 88 being provided with a stop cock 89 which, under normal conditions, will be adjusted to closed condition. With this provision it will be seen that by opening the cock 89 the pressure upon either side of the valve of the casing 78' may be equalized, and whereby opening thereof, if desired, may be effected, since by equalizing the pressure upon either side of said valve the same will drop to opening position by its own weight. A by-pass pipe 91 also connects the pipes 26 and 57 adjacent their connections with the pipe 2 or casing 9. A stop cock 91' is also provided in said pipe, the same under normal conditions remaining in closed condition. This provision is made so that, if for any reason, the valve 15 should become inoperative, the same may be cut out without stopping the flow of fluid through the apparatus. This provision, however, together with the numerous stop cocks provided at intervals throughout the system are provided in order to afford means whereby various emergencies which may arise may be coped with.

While I have shown what I deem to be the preferable form of my invention I do not wish to be limited thereto as there might be various changes made in the details of construction and arrangement of parts described without departing from the spirit of the invention comprehended within the scope of the appended claims.

Having described my invention what I claim as new and desire to secure by Letters Patent is:

1. The combination in a refrigerating apparatus, of a compressor; inlet and outlet pipes for said compressor; a check valve in the outlet pipe; a valve in the inlet pipe arranged to stop the passage to the compressor; a differential piston and cylinder; an operative connection between said inlet valve and said piston so arranged that the action of the larger piston unseats said valve and the action of the smaller piston seats the valve; an open connection between the outlet pipe on the compressor side of said check valve and the larger cylinder; and an open connection between said outlet pipe on the other side of said check valve and the smaller cylinder, substantially as described.

2. The combination in a refrigerating apparatus, of a compressor; inlet and outlet pipes for said compressor; a check valve in the outlet pipe; a valve in the inlet pipe arranged to stop the passage to the compressor; manual means for operating said valves; a differential piston and cylinder; an operative connection between said inlet valve and said piston so arranged that the action of the larger piston unseats said valve and the action of the smaller piston seats the valve; an open connection between the inlet pipe on the compressor side of said check valve and the larger cylinder; and an open connection between said outlet pipe on the other side of said check valve and the smaller cylinder, substantially as described.

3. The combination in a refrigerating apparatus of a compressor; inlet and outlet pipes for said compressor; a valve casing for said outlet pipe, the said valve casing being divided into inlet and outlet compartments by a portion having a port; a valve in the outlet compartment arranged to close said port, said valve being carried by a threaded valve stem having a connection with said valve permitting longitudinal movement of the valve; a differential cylinder arranged in said casing with its larger cylinder in open communication with said inlet compartment; a pipe connecting said outlet compartment with the smaller cylinder; a valve casing for said inlet pipe; a valve in said casing carried by a threaded stem having a connection therewith which permits of longitudinal movement therein; and an operative connection between said piston and the valve in said inlet casing, substantially as described.

4. The combination in a refrigerating apparatus of a compressor; inlet and outlet pipes for said compressor; a valve casing for said outlet pipe, the said valve casing being divided into inlet and outlet compartments by a portion having a port; a valve in the outlet compartment arranged to close said port, said valve being carried by a threaded valve stem having a connection with said valve permitting longitudinal movement of the valve; a differential cylinder arranged in said casing with its larger cylinder in open communication with said inlet compartment; a pipe connecting said outlet compartment with the smaller cylinder; a valve casing for said inlet pipe; a valve in said casing carried by a threaded stem having a connection therewith which permits of longitudinal movement therein, the said valve being arranged in axial alinement with said piston; a piston rod connecting said piston and said inlet valve; and a turn-buckle connection for said piston rod, substantially as described.

5. The combination in a refrigerating apparatus, of a compressor, inlet and outlet pipes for said compressor; a check valve in the outlet pipe; a valve in the inlet pipe arranged to stop the passage to the compressor; a differential piston and cylinder; an operative connection between said inlet valve and said piston so arranged that the action of the larger piston unseats said valve and the action of the smaller piston seats the valve; an open connection between the outlet pipe on the compressor side of said check valve and the larger cylinder; an open connection between said outlet pipe on the other side of said check valve and the smaller cylinder; machinery for operating the refrigerating apparatus; a belt controlling the operation of said machinery; a differential cylinder and piston; a connection between said piston for shifting said belt to inoperative position upon operation of the smaller piston; an open connection between the outlet pipe on the compressor side of said check valve and said last mentioned larger cylinder; and an open connection between said outlet pipe on the other side of said check valve and said last mentioned smaller cylinder, substantially as described.

6. The combination in a refrigerating apparatus, of a compressor; inlet and outlet pipes for said compressor; a check valve in the outlet pipe; a valve in the inlet pipe arranged to stop the passage to the compressor; a differential piston and cylinder; an operative connection between said inlet valve and said piston arranged so that the action of the larger piston unseats said valve and the action of the smaller piston seats the valve; an open connection between the outlet pipe on the compressor side of said check valve and the larger cylinder; an open connection between said pipe on the other side of said check valve and the smaller cylinder; a liquid receptacle and expansion coils in said apparatus and connected together; a valve in said connection; a differential cylinder and piston; a connection between said last named piston and said last named valve arranged to seat said valve upon operation of said smaller piston; an open connection between the outlet pipe on the compressor side of said check valve and said last mentioned larger cylinder; and an open connection between said outlet pipe on the other side of said check valve and said last mentioned smaller cylinder, substantially as described.

In testimony whereof I have signed my name to this specification in the presence of two subscribing witnesses.

ALBERT GAIDE.

Witnesses:
JANET E. HOGAN,
JOSHUA R. H. POTTS.